(12) United States Patent
Azai

(10) Patent No.: US 7,065,773 B2
(45) Date of Patent: Jun. 20, 2006

(54) DISC LOADING-AND-UNLOADING STRUCTURE FOR DISC APPARATUS

(75) Inventor: Kouji Azai, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 423 days.

(21) Appl. No.: 10/694,040

(22) Filed: Oct. 28, 2003

(65) Prior Publication Data

US 2004/0085866 A1 May 6, 2004

(30) Foreign Application Priority Data

| Oct. 28, 2002 | (JP) | ............................. 2002-312475 |
| Oct. 29, 2002 | (JP) | ............................. 2002-314096 |
| Oct. 29, 2002 | (JP) | ............................. 2002-314102 |
| Oct. 30, 2002 | (JP) | ............................. 2002-315787 |

(51) Int. Cl.
*G11B 17/04* (2006.01)

(52) U.S. Cl. ................................................ 720/622

(58) Field of Classification Search ................ 720/622, 720/623; 369/75.21, 77.11; 360/99.06, 360/99.07, 99.12
See application file for complete search history.

(56) References Cited

U.S. PATENT DOCUMENTS

| 5,416,763 | A | * | 5/1995 | Ohsaki ........................ 720/623 |
| 6,028,831 | A | * | 2/2000 | Scholz et al. ................ 720/621 |
| 6,125,090 | A | * | 9/2000 | Nakamichi ................... 720/622 |
| 6,192,019 | B1 | * | 2/2001 | Kurokawa et al. ........... 720/623 |
| 6,288,982 | B1 | * | 9/2001 | Kato ........................ 369/30.36 |
| 6,826,766 | B1 | * | 11/2004 | Tuchiya ....................... 720/620 |
| 6,880,160 | B1 | * | 4/2005 | Lee et al. .................... 720/623 |

FOREIGN PATENT DOCUMENTS

| JP | 2-7263 | 1/1990 |
| JP | 2002-367261 | 12/2002 |

* cited by examiner

*Primary Examiner*—Tianjie Chen
(74) *Attorney, Agent, or Firm*—Wenderoth, Lind & Ponack, L.L.P.

(57) ABSTRACT

To make simple in structure and to still ensure precise disc loading, a disc loading-and-unloading structure for a disc apparatus comprises a drive motor, a drive roll assembly, a free-roll slider, a rotary lever, a slider, and link-and-spring connection means. The drive roll assembly has first and second drive rolls, an intervening transmission gear wheel, and a rotatable arm plate. The first drive roll is rotatably fixed to a stationary stud axle next to one end of the disc slot, and is connected to the drive motor. The first and second drive rolls are fixed to the opposite ends of the rotatable arm plate with the intervening transmission gear wheel sandwiched therebetween. The free-roll slider is next to the other end of the disc slot. The free-roll slider has first and second free rolls, and a slidable arm plate, and the first and second free rolls are fixed to the opposite ends of the slidable arm plate. The rotary lever lies on the rear side of the chassis so that its free end may abut on the disc when advancing toward the final rear position. The slider is operatively connected to the rotary lever. The link-and-spring connection means normally urges the free-roll slider toward the drive roll assembly, allowing the free-roll slider to move apart from the drive roll assembly as a counter action to the hitting-and-pushing by a disc when inserted from the disc slot.

4 Claims, 10 Drawing Sheets

DISC LOADING-AND-UNLOADING STRUCTURE FOR DISC APPARATUS

BACKGROUND OF THE INVENTION

1. Field of the Invention

The present invention relates to a disc loading-and-unloading structure for a disc apparatus having rolls arranged at the both sides of a disc insert slot thereof for carrying and putting a disc on a turntable of the apparatus and for removing from the turntable and carrying the disc outside of the apparatus by rotating those rolls.

2. Related Art

In a disc apparatus recording or reproducing of data in a disc is performed by putting the disc on the turntable and rotating it. There are two different disc loading-and-unloading methods principally; one is to use a disc tray going in and out of a tray insert slot for carrying and put the disc on the turntable; and the other is to pull in a disc directly when the disc is inserted from a disc slot made on the front of the apparatus. The present invention relates to the latter type of loading-and-unloading structure.

This type of disc loading-and-unloading structure is disclosed in JP2-7263 (A) titled "Loading Device for CD Player". The loading device comprises first and second belt drive mechanisms arranged oppositely each having an endless belt running around two rolls, one of which rolls is arranged at the side of the disc insert slot, and a drive motor for driving the endless belts in one or the other direction. The drive motor is operatively connected to at least one of the first and second belt drive mechanisms. The roll-and-belt combinations are articulated with two link rods, which, in turn, are connected both to a single solenoid and to a return spring, by which the articulated roll-and-belt combinations are normally spring-biased toward their original position, where the roll-and-belt combinations are converge toward the disc slot. In response to insertion of a disc the solenoid is energized, pulling both roll-and-belt combinations against the return spring, and pinching the disc therebetween. Then, the drive motor starts rotation to make the roll-and-belt combinations carry the disc inward.

The articulated roll-and-belt combinations are responsive to insertion of a disc from the disc slot for adjustably moving apart from or close to each other, and the moving distance is dependent on what size the disc has and which points of the disc circumference the opposite endless belts touch. The loading device, however, is complicated in structure, and is susceptible to malfunctions.

JP2002-367261 (A) discloses a "Recording Medium Driver", in which: three rotatable arms each having a roll at its free end are arranged on a circular circumference, and are spring-biased so as to direct their rolls toward the center; and two out of these three arms are so arranged as to put their rolls next to the opposite sides of the disc slot. Thus, their rolls may be applied to a disc when inserted from the disc slot. In loading all the arms move in unison to hold the disc on the circumference under the influence of the spring. This structure, however, does not work with precision because of the imbalance in the resilient forces applied by the rotatable arms to the disc circumference.

In view of the above, one object of the present invention is to provide a disc loading-and-unloading structure, which is simple in structure, still capable of performing all required actions for loading and unloading with precision.

SUMMARY OF THE INVENTION

To attain this object a disc loading-and-unloading structure for a disc apparatus according to the present invention comprises: a drive motor; a drive roll assembly comprising first and second drive rolls and, an intervening transmission gear wheel, and a rotatable arm plate, the first drive roll being rotatably fixed to a stationary stud axle standing upright on a chassis of the disc apparatus, next to one end of a disc slot made in the front of the apparatus, and the first drive roll being connected to the drive motor; the first and second drive rolls being fixed to the opposite ends of the rotatable arm plate with the intervening transmission gear wheel sandwiched therebetween; a free-roll slider movably fixed to the chassis of the apparatus, next to the other end of the disc slot, the free-roll slider comprising first and second free rolls, and a slidable arm plate, the first and second free rolls being fixed to the opposite ends of the slidable arm plate; a rotary lever rotatably fixed to the chassis on the rear side of the chassis so that its free end may abut a disc when being inserted from the disc slot and advancing toward the rear side in the apparatus; a slider operatively connected to the rotary lever; and link-and-spring connection means for normally urging the free-roll slider toward the drive roll assembly, allowing the free-roll slider to move apart from the drive roll assembly as a counter action to hitting-and-pushing by the disc when inserted into the apparatus.

The drive roll assembly, the free-roll slider and the rotary lever may be adapted to work together and hold the disc on the circumference by applying the second drive roll, the second free roll and the free end of the rotary lever to three points on the circumference of the disc.

A disc loading-and-unloading structure may further comprise a pinion connected to the drive motor, the slider may have a rack fixed thereon and a cam slot made on its rear side, the rack being placed toward the disc slot, extending rearward in the disc-carrying direction; and the rotary lever has means for urging its free end toward the disc when advancing rearwards from the disc slot, and has a boss slidably fitted in the cam slot of the slider, whereby inclination of the rotary lever when being hit and pushed by the advancing disc makes the boss follow the contour of the cam slot, thus making the pinion mesh with the rack, and allowing the rack and pinion to drive the slider rearward.

The link-and-spring connection may comprise a series link connection of first, second and third links articulated with each other, the first link being connected to the free-roll slider, the second link being articulated to the rotatable arm plate of the drive roll assembly, and the third link being rotatably fixed around a stationary stud axle, and being articulated both to the first and second links; the slider has a cam rib extending from its front edge; the drive roll assembly has a guide pin standing upright on the rotatable arm plate, which the guide pin being adapted to ride on the cam rib when the slider remains in the forward position, and depart from the cam rib when the slider is driven rearward, thus allowing the second drive roll, the second free roll and the free end of the rotary lever to depart from the circumference of the disc simultaneously.

A disc loading-and-unloading structure may further comprise start and stop switches, the start switch being responsive to the lateral movement of the free-roll slider for turning on, thus starting the drive motor, and the stop switch is responsive to arrival of the slider at the final rear position for turning off, thereby stopping the drive motor.

Even when a disc loading-and-unloading structure is designed for handling a large-sized disc (120 mm in diameter), a small-sized disc (80 mm in diameter) can be handled by using an adapter.

When a disc is inserted from the disc slot, and is pinched between the first drive roll and the first free roll, advance of the disc makes the first free roll yieldingly move sideways, still keeping contact with the disc. Still further advance of the disc toward the final rear position causes the second drive roll and the first free roll to pinch the disc at two points on the disc circumference, and the second drive roll and the first and second free rolls to pinch together the disc at three points. In either case, the drive force is transmitted from the drive motor to the second drive roll through the first drive roll, the first concentric gear wheel, the intervening gear wheel, and the second concentric gear wheel, so that all rolls rotate together in the disc-carrying direction.

In loading a disc into a disc apparatus the loading-and-unloading structure works as follows:

(1) when inserting the disc from the disc slot by hand, the disc pushes the first free roll, and hence the free-roll slider as a whole sideways, making the start switch turn on through the agency of an intervening rotary lever, which is associated both with the free-roll slider and the start switch;

(2) the drive motor starts running to rotate the first and second drive rolls, thereby pulling the disc inward; at first the first drive roll and the first free roll pinch the disc, and next four rolls of the first and second drive rolls and the first and second free rolls pinch together and pulling the disc inward, and then the second drive roll and the first and second free rolls pinch together the disc at three points of the disc circumference;

(3) the advancing disc pushes up the free end of the rotary lever, thereby making the rotary lever rotate counterclockwise, and hence its boss move and abut the rear end of the cam slot of the slider, thus moving the slider rearward until the rack of the slider and the associated pinion mesh together, and then the slider is driven rearward by the drive motor, which is connected to the pinion;

(4) while the slider is driven rearward, the boss of the rotary lever remains still in the cam slot of the slider, thus keeping the rotary lever still while its free end continues to abut on the disc circumference. In this position the disc is supported at three points by the free end of the rotary lever, the second drive roll and the second free roll, and then the traverse unit is inclined up and leveled off to allow the disc to be laid on the turn table and clamped there.

(5) When the boss of the rotary lever abuts the front end of the cam slot of the slider, and when the boss is pushed up by the front end of the cam slot, the rotary lever is made to turn counterclockwise, thus allowing its free end to leave the disc, and at the same time, the second drive roll is made to leave the disc by the interaction between the guide pin of the drive roll assembly and the cam rib of the slider, and the second free roll is made to leave the disc through the linkage between the drive roll assembly and the free-roll slider. Then, the disc is released. When reaching the final rear position, the slider abuts on the stop switch to turn it off, making the drive motor stop. Then, the disc apparatus is ready to record and/or reproduce sound or pictures from the disc.

In unloading the disc from the disc apparatus the loading-and-unloading structure works as follows:

(1) the unloading button is depressed to rotate the drive motor in the opposite direction, so that rotation of the pinion drives the rack of the slider in the forward direction;

(2) the rotary lever turns, and the second drive roll and free rolls come close to the disc until the disc is held at three-points by the free end of the rotary lever, the second drive roll and second free roll;

(3) the traverse unit is inclined down to leave the three-points supported disc behind, and at the same time, the clamp releases it;

(4) the slider still advances until the rack leaves the pinion;

(5) the three-points supported disc is moved forward by the rotating second drive roll, and then the disc is pinched and supported at four-points by the first and second drive rolls, and by the first and second free rolls. Finally the disc is pinched between the first drive roll and the first free roll, and the two-points supported disc is pushed out of the disc slot. Then, the free-roll slider moves inside, and turns the start switch off.

As may be apparent from the above, the start switch is responsive to insertion of a disc from the disc slot for turning on, executing a series of actions, that is, pulling-in, positioning, and releasing the disc. Conversely depression of the removal button causes another series of actions, that is, removing the disc from the turntable, pushing out the disc and stopping the drive motor. The transmission mechanism for effecting such series of actions uses a single motor and a minimum number of control means, and therefore, the loading-and-unloading structure is less expensive.

Other objects and advantages of the present invention will be understood from the following description of a disc loading-and-unloading structure in a disc according to one preferred embodiment of the present invention, which is shown in accompanying drawings.

DETAILED DESCRIPTION OF PREFERRED EMBODIMENT

Figure 1:
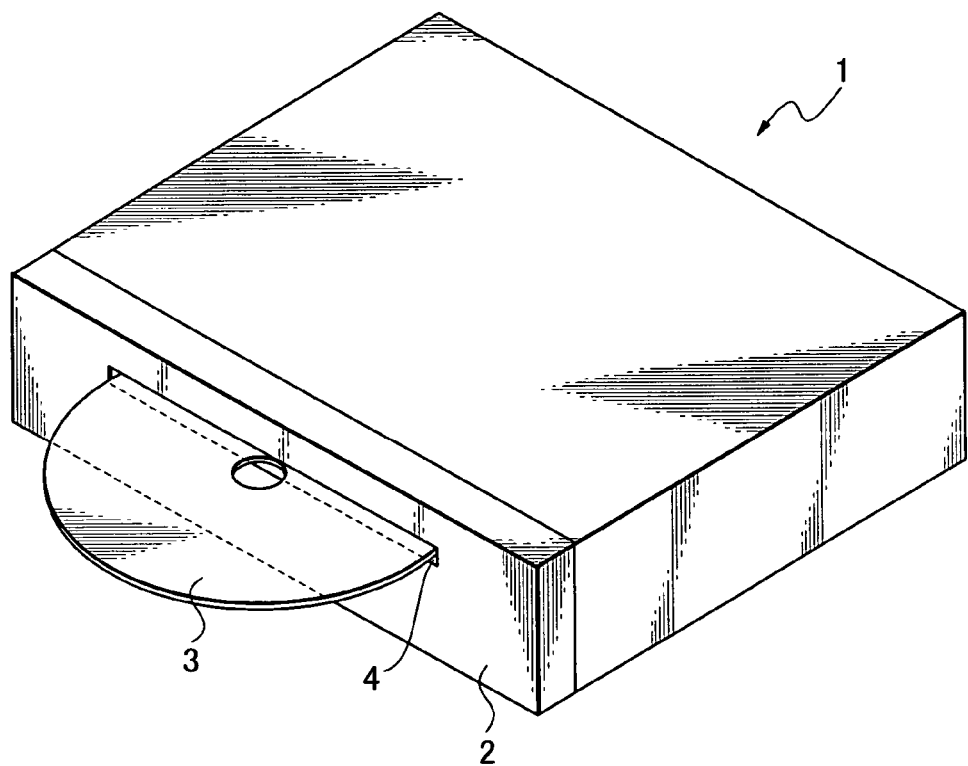
FIG. 1 is a perspective view of a disc apparatus equipped with a disc loading-and-unloading structure according to the present invention, illustrating how a disc is inserted into the disc slot.

FIG. 1 shows a disc apparatus 1 equipped with a disc loading-and-unloading structure according to the present invention. A disc slot 4 is formed at a front panel 2 of the disc apparatus 1. A disc 3 is pushed in the disc slot 4 a little by hand, and then it can be automatically pulled in the apparatus.

Referring to the drawings, particularly to FIGS. 2, 4, 6, 7 and 10, the disc loading-and-unloading structure comprises a drive motor 37, a drive roll assembly 8, a free-roll slider 14, a rotary lever 26, a side lever 16, a slider 30 operatively connected to the rotary lever 26; and link-and-spring connection means 19, 20, 22 and 25 for normally urging the free-roll slider 14 toward the drive roll assembly 8.

Figure 2:
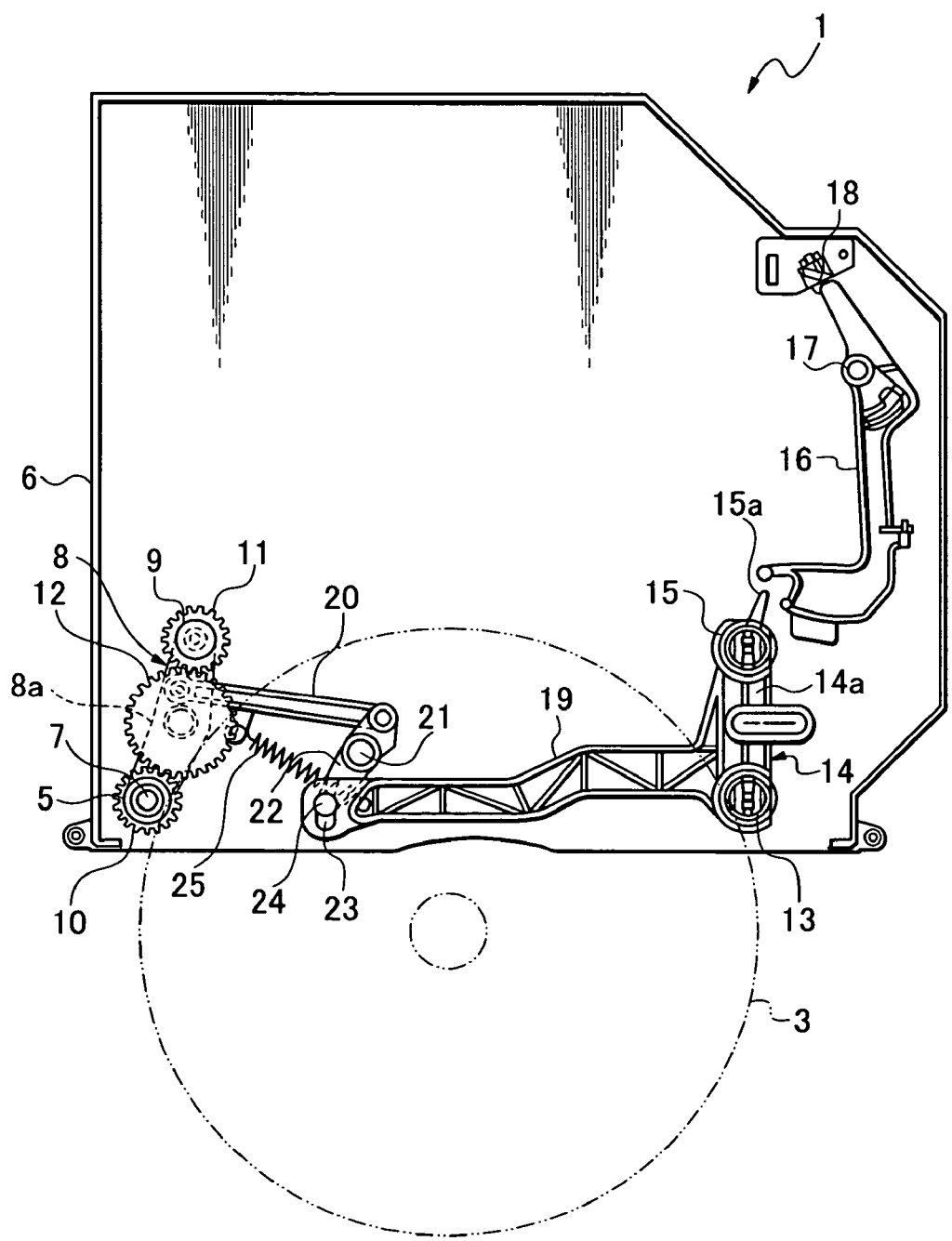
FIG. 2 illustrates the disc loading-and-unloading structure with a disc partly inserted from the disc slot.

The drive roll assembly 8 comprises first and second drive rolls 5 and 9, an intervening transmission gear wheel 12, and a rotatable arm plate 8a (see FIG. 2). The first drive roll 5 has a first gear wheel 10 fastened concentric therewith, and the first drive roll 5 is rotatably fixed to a stationary stud axle 7. It stands on the chassis 6 of the apparatus 1 next to one end of the disc slot 4, which is made in the front panel 2. The second drive roll 9 has a second gear wheel 11 fastened concentric therewith. The first drive roll 5 is connected to the drive motor 37 via a gang of gear wheels (see FIG. 6), which are later described in connection with the rack-and-pinion for driving the slider 30. The first and second drive rolls 5 and 9 are fixed to the opposite ends of the rotatable arm plate 8a with the intervening transmission gear wheel 12 sandwiched between the first and second gear wheels 10 and 11 (see FIG. 2). Rotation of the first drive roll 5 can be transmitted to the second drive roll 9 via the first gear wheel 10 and the intervening gear wheel 12. The second drive roll 9 can swing about the stationary stud axle 7 to be applied to the disc 3 inserted from the disc slot 4.

The free-roll slider 14 is movably fixed to the chassis 6 of the apparatus, next to the other end of the disc slot 4. The free-roll slider 14 comprises first and second free rolls 13 and 15, and a slidable arm plate 14a. The first and second free rolls 13 and 15 are fixed to the opposite ends of the slidable arm plate 14a. The free roll slider 14 can move apart from the drive roll assembly 8 when it is hit and pushed by the disc 3, which moves rearward.

The side lever 16 functions as a start switch actuator, and is a hook-like lever rotatably fixed to a stud pivot 17 with one end next to the second free roll 15, and with the other end next to a start switch 18 (see FIG. 2). The second free roll 15 has a finger 15a projecting toward the one end of the hook-like side lever 16. In response to insertion of the disc 3 from the disc slot 4, the first free roll 13 yieldingly moves rightward (see FIG. 2), so that the finger 15a of the second free roll 15 abuts on the one end of the side lever 16. Thus, the side lever 16 turns about its stud pivot 17, turning the start switch 18 on. Then, the drive motor 37 starts running. The drive motor 37 rotates in the direction in which the disc 3 is pulled in. Thus, the disc 3 is jerked in the apparatus. As the first drive roll 5 is rotated by the drive motor 37, the second drive roll 9 rotates, and it swings about the stationary stud axle 7. The second drive roll 9, in fact, follows the advancing disc while keeping contact with the circumference of the disc all the time.

Figure 3:
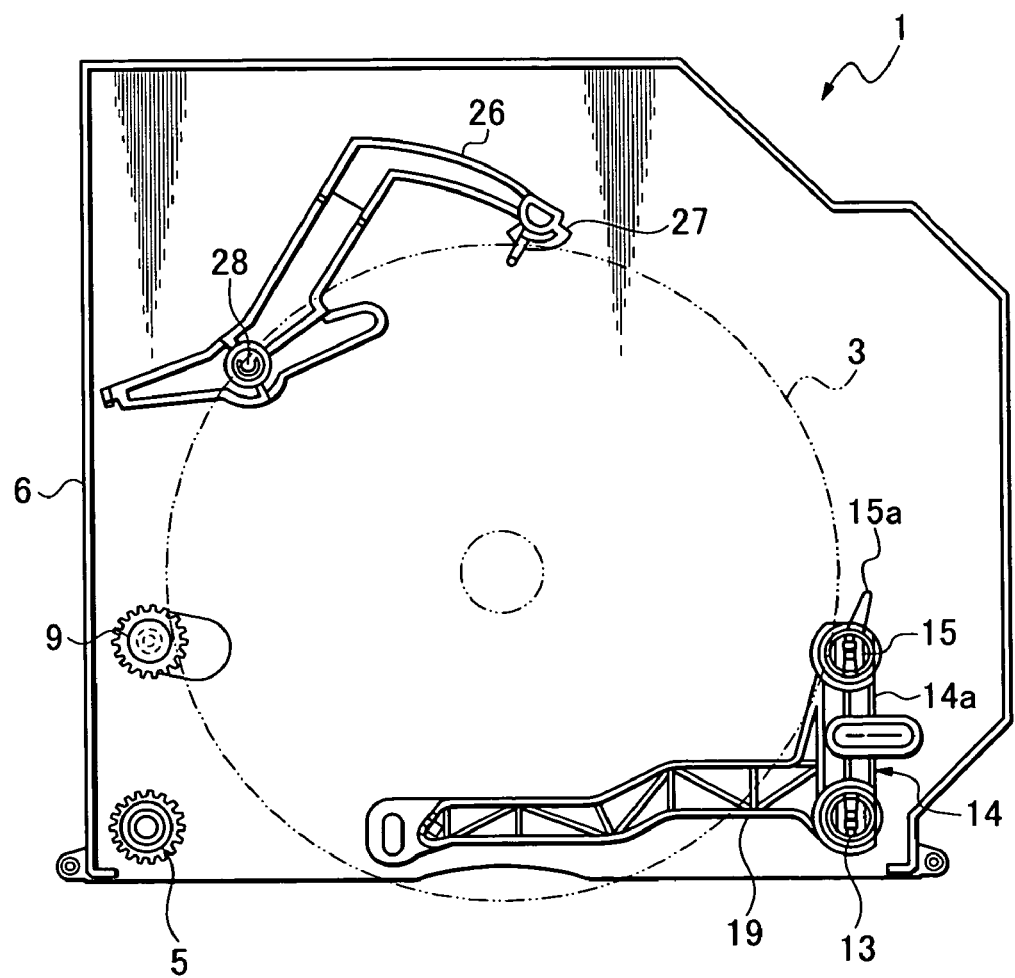
FIG. 3 is illustrates the disc loading-and-unloading structure with the inserted disc just abutting the free end of the rotary lever.
Figure 4:
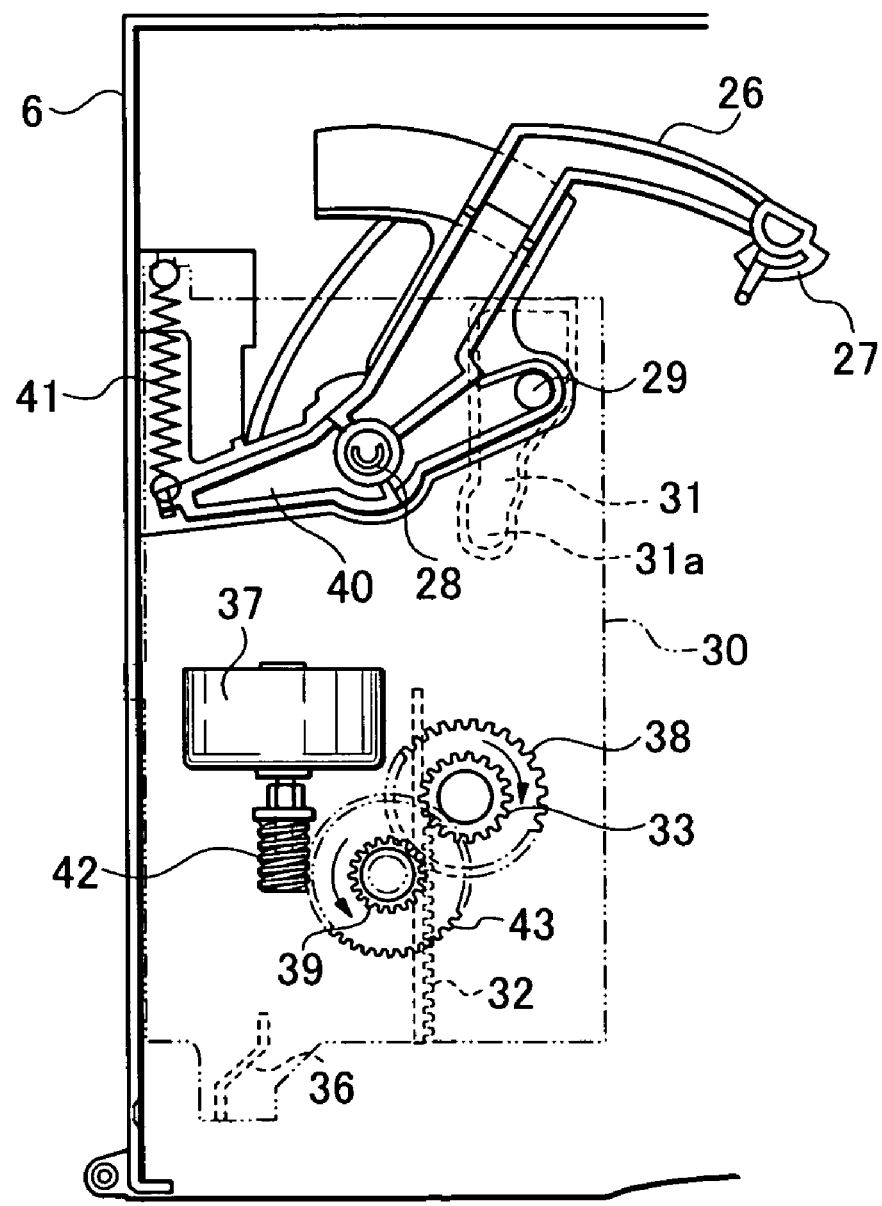
FIG. 4 illustrates the lever and slider combination composing of the disc positioning mechanism of the loading-and-unloading structure.
Figure 5:
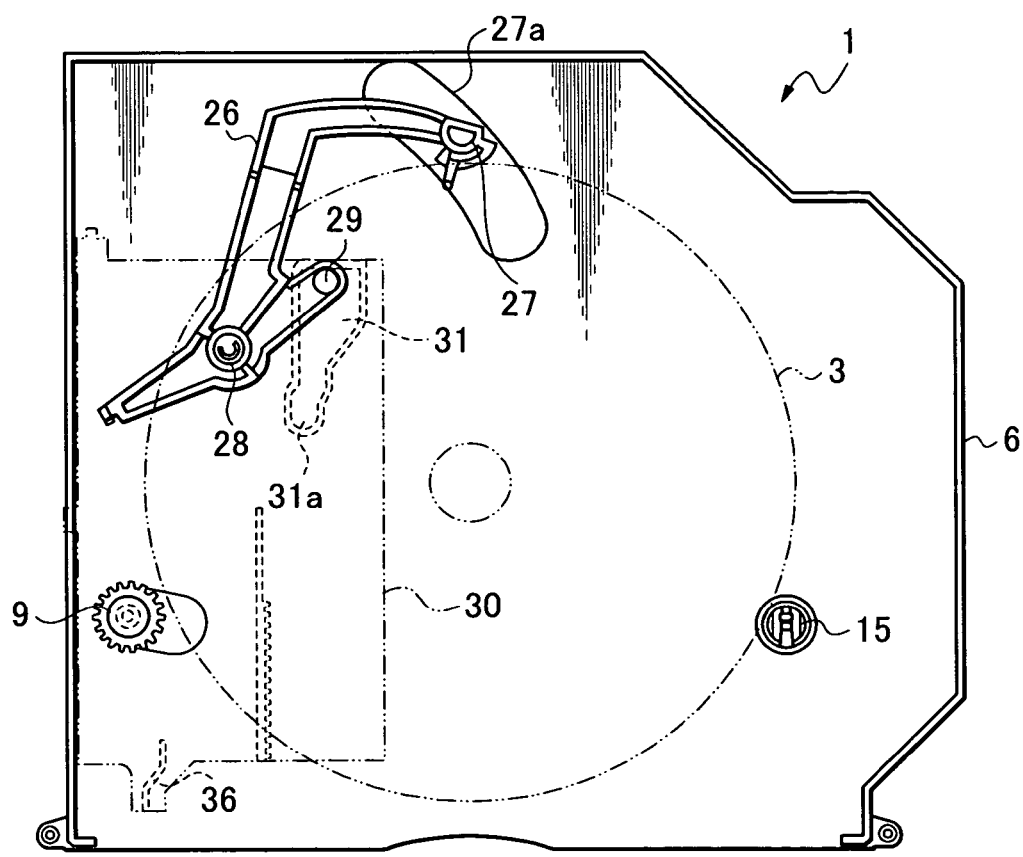
FIG. 5 illustrates how the advancing disc hits and pushes the rotary lever, yieldingly rotating and giving the way to the disc to the final loading position.
Figure 6:
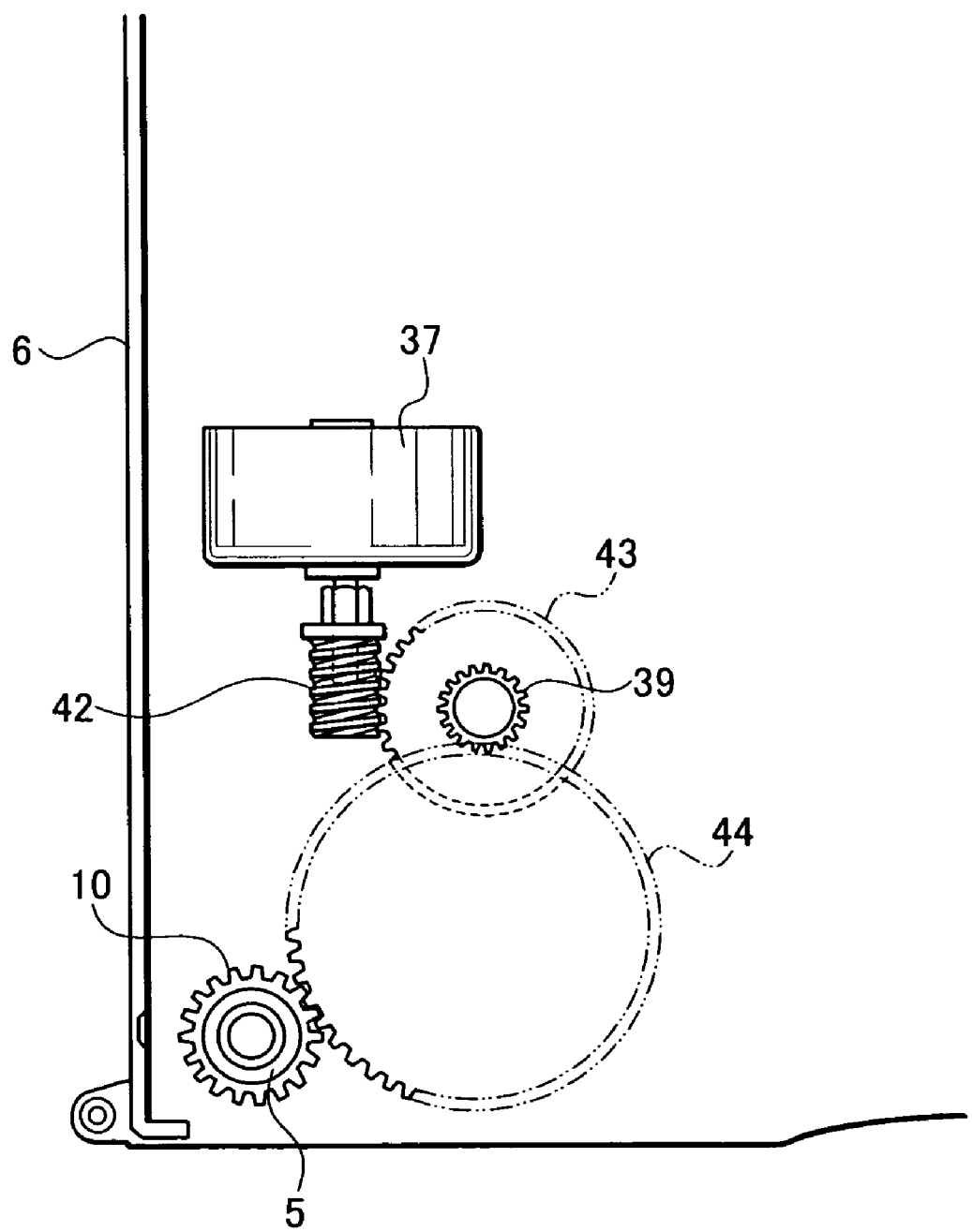
FIG. 6 illustrates a drive mechanism for rotating the first drive roll of the drive roll assembly.

The rotary lever 26 is a flattened-and-inclined "S" shaped piece (see FIGS. 3, 4 and 5), and is rotatably fixed to a stud pivot 28 on the rear side of the chassis 6 so that its free end 27 may abut the disc 3 when advancing rearward (see FIG. 3). The rotary lever 26 rotates about its pivot 28 over a predetermined angle, which is determined by an arc slot 27a corresponding to a selected part of the circle whose center is the stud pivot 28 of the rotary lever 26 (see FIG. 5). The lower oblique part 40 of the rotary lever 26 is connected at its end to the chassis 6 by a coiled spring 41 so that the rotary lever 26 is spring-biased to turn clockwise about the stud pivot 28. The rotary lever 26 has a boss 29 formed on its short oblique extension opposing to the lower oblique part 40 with respect to the stud pivot 28.

The slider 30 is slidably attached to the chassis 6 to move back and forth between the second drive gear wheel 11 of the drive roll assembly 8 and the lower oblique part 40 of the rotary lever 26. The slider 30 has a cam slot 31 made at one rear corner, and the slider 30 is operatively connected to the rotary lever 26 by inserting the boss 29 of the rotary lever 26 in the cam slot 31 (see FIG. 4). The cam slot 31 is so shaped that inclination of the rotary lever 26 about its pivot makes the slider 30 move back and forth through the interaction between the boss 29 and the cam slot 31. The slider 30 has a rack 32 formed on its lower surface, and it has a cam rib 36 formed on its lower surface. A gang of gear wheels are fixed to the chassis 6, comprising a rack drive gear wheel 38, a small gear wheel 39 meshing with the rack drive gear wheel 38, a slant gear wheel 43 concentric with the small gear wheel 39, and a worm wheel 42 meshing with the slant gear wheel 43. The worm wheel 42 is fixed to the shaft of the drive motor 37. A pinion 33 is concentrically fixed to the rack drive gear wheel 38, and the pinion 33 meshes with the rack 32. Thus, the driving power is transmitted from the drive motor 37 to the slider 30 through the gang of gear wheels. Also, the small gear wheel 39 meshes with a drive gear wheel 44, which meshes with the first drive gear wheel 10 (see FIG. 6). Thus, the first drive roll 5, which is concentrically fixed to the first drive gear wheel 10, can be driven by the drive motor 37.

The link-and-spring connection means 19, 20, 22 and 25 normally urges the free-roll slider 14 toward the drive roll assembly 8. A series link connection of first, second and third links 19, 20, 22 are articulated together (see FIG. 2). The first link 19 is connected to the free-roll slider 14; the second link 20 is articulated to the rotatable arm plate 8a of the drive roll assembly 8; and the third or intervening link 22 is articulated both to the first and third links 19 and 20. The intervening link 22 is rotatably fixed to a stud pivot 21, which stands upright on the chassis 6. The first link 19 is stationary, and it has an elliptical hole 23 made on its free end. The intervening link 22 is loosely connected at one end by inserting its joint pin 24 in the elliptical hole 23 of the first link 19. The first link 19 is connected to the second link 20 by a coiled spring 25, urging the first and second drive rolls 5 and 9 as well as the first and second free rolls 13 and 15 toward the disc 3. In place of the coiled spring 25 the free-roll slider 14 may have spring-biasing means to urge itself toward the disc 3. Otherwise, a coiled spring may be wound around the stud pivot 21 to rotate the intervening link 22 clockwise. In any event the spring means functions to normally urge the free-roll slider toward the drive roll assembly, thereby allowing the free-roll slider to move apart from the drive roll assembly as a counter action to the hitting and pushing by a disc 3 when inserted into the apparatus. Thus, the disc 3 is pinched between the first drive roll 5 and the first slide roll 13.

Figure 10:
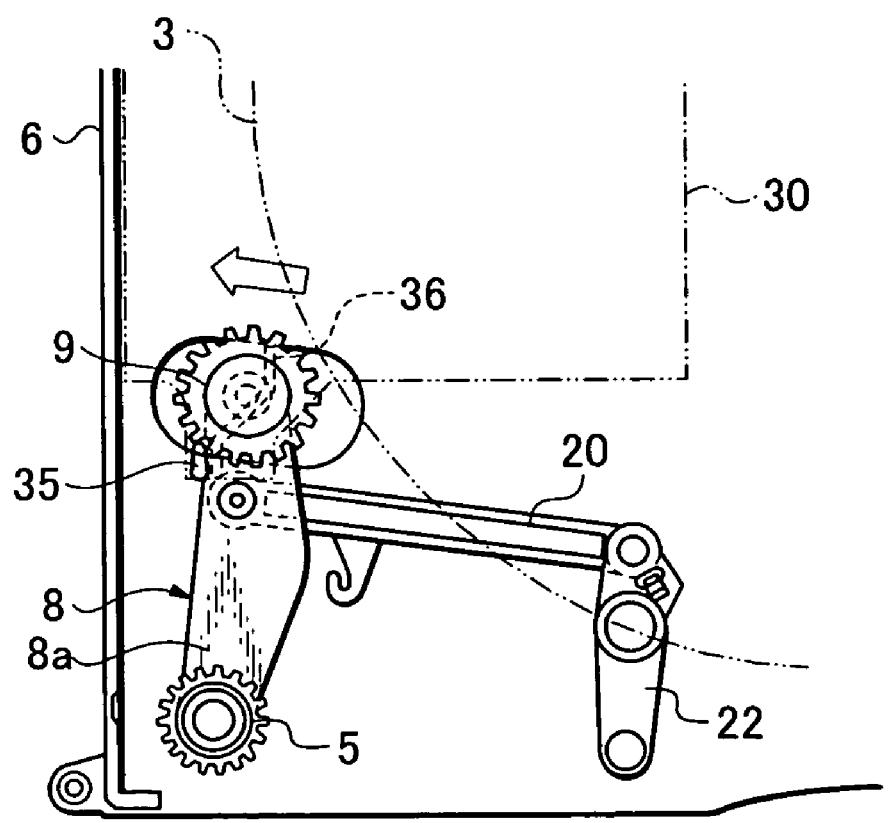
FIG. 10 illustrates how the second drive roll leaves the disc.

The drive roll assembly 8 has a guide pin 35 standing upright on the rotatable arm plate 8a (see FIG. 10). The guide pin 35 is adapted to ride on the cam rib 36 while the slider 30 moves rearward, and it departs from the cam rib 36 when the slider 30 reaches the final rear position, thus allowing the second drive roll 9, the second free roll 15 and the free end 27 of the rotary lever 26 to depart from the circumference of the disc 3 simultaneously. A stop switch 34 is placed at the rear, left corner of the chassis 6, and is responsive to arrival of the slider 30 at the final rear position for operating and stopping the drive motor 37 (see FIG. 7).

Figure 7:
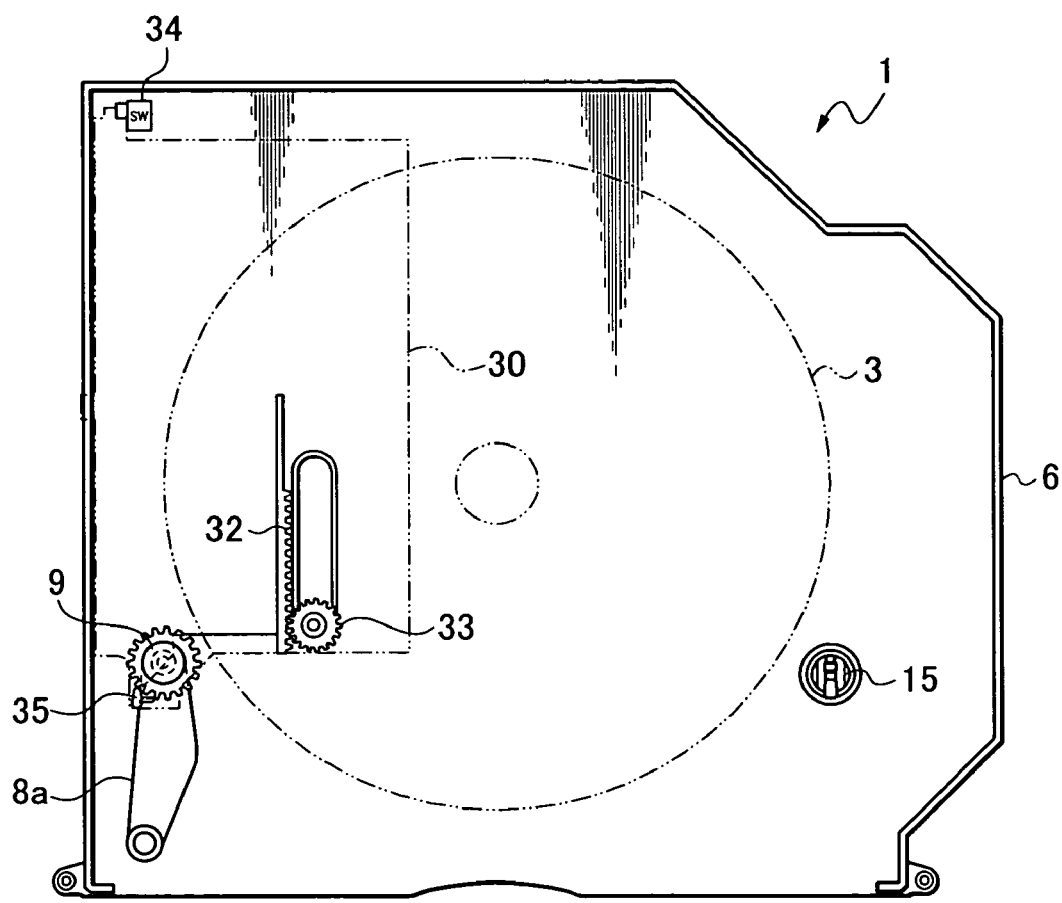
FIG. 7 illustrates that the disc is fully inserted in the apparatus, the slider being driven to the final rear position.

According to the disc loading-and-unloading structure in the disc apparatus as above mentioned, when the drive motor 37 starts running, the first and second drive rolls 5 and 9 starts running. The drive motor 37 rotates the pinion 33 via the gear wheels 43, 39 and 38, but the slide 30 cannot move until the pinion 33 meshes with the rack 32 (see FIG. 4). The disc 3 pushes up the free end 27 of the rotary lever 26 (see FIG. 5), thereby making the boss 29 follow the cam slot 31, driving the slider 30 until the rotating pinion 33 meshes with the rack 32. Then, the slider 30 is moved rearward. When the boss 29 abuts on the terminal end of the cam slot 31, the rotary lever 26 is rotated counterclockwise until its free end 27 leaves the disc 3. FIG. 7 shows that the slider 30 reaches the final rear position to actuate the stop switch 34.

Figure 8:
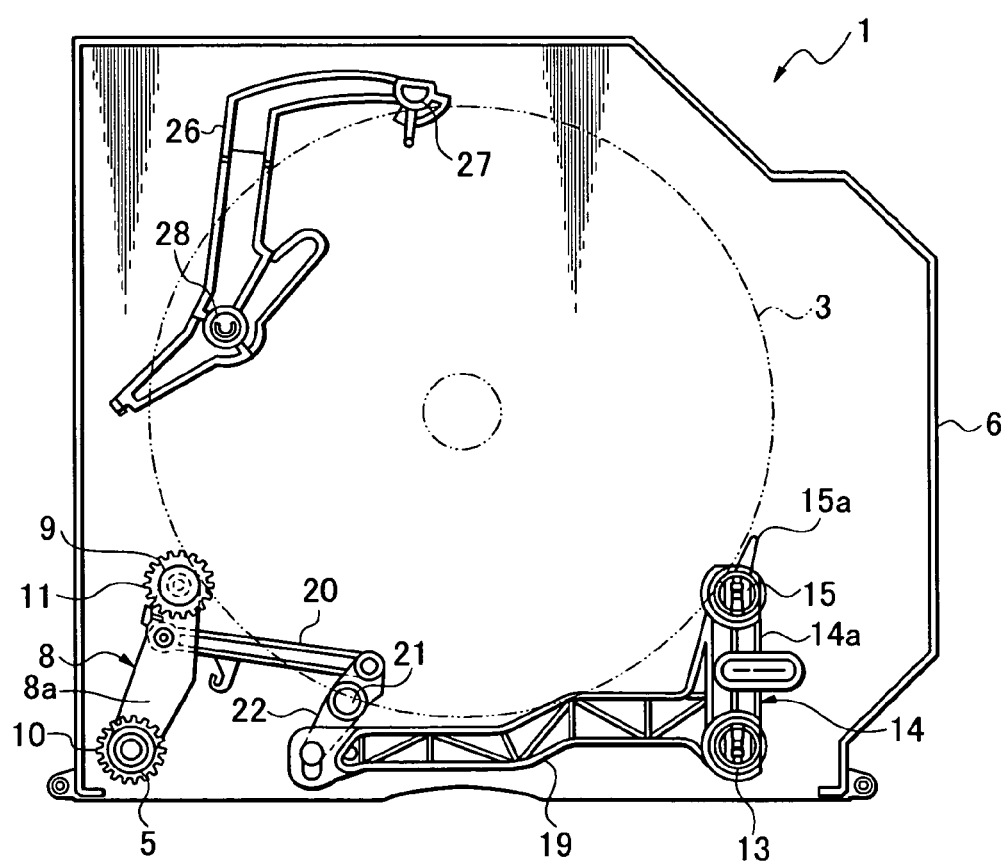
FIG. 8 illustrates that the disc is fully inserted in the apparatus, the disc being held at three points on its circular circumference by the second drive roll, the second free roll and the free end of the rotary lever.

While the slider 30 moves rearward, the rotary lever 26 remains still, and then the second drive roll 9, the second free roll 15, and the free end 27 of the rotary lever 26 work together and hold the disc 3 on the circumference at three points. The second drive roll 9 rotates and drives the disc 3 rearward, but the boss 29 moves in the cam slot 31 without being blocked, and therefore the rotary lever 26 is not affected. Thus, the disc 3 is still three-point supported, and positively positioned by the second drive roll 9, the second free roll 15, and the free end 27 of the rotary lever 26 (see FIG. 8). In this position the traverse unit is inclined up and leveled off, and the disc 3 is laid on the turntable, and is clamped. Further withdrawal of the slider 30 makes the boss 29 abut on the terminal end 31a of the cam slot 31, and then, the boss 29 is pushed up, allowing the rotary lever 26 to rotate counterclockwise.

Figure 9:
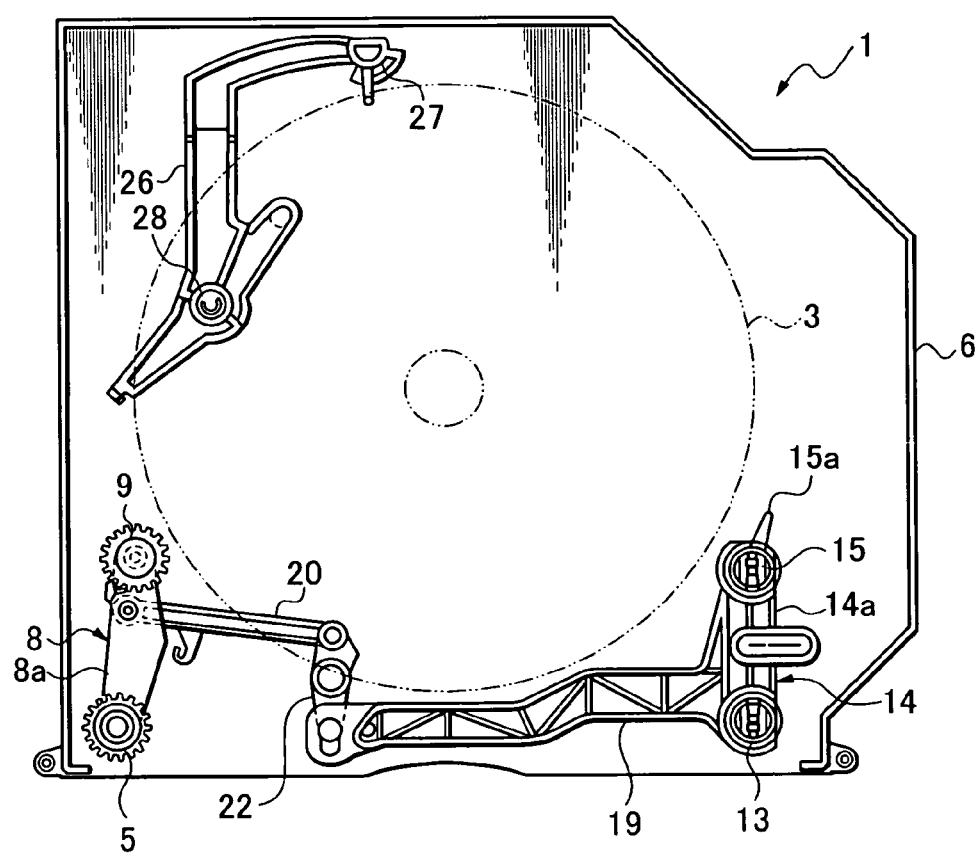
FIG. 9 illustrates the disc is fully inserted, the second drive roll, the second free roll and the free end of the rotary lever being apart from the circular circumference of the disc.

As a result the free end 27 of the rotary lever leaves the disc 3, and at the same time, the rotatable arm plate 8a swings counterclockwise as later described, permitting the second drive roll 9 to leave the disc 3. The swinging of the rotatable arm plate 8a so affects the series connection of links 20, 22 and 19 that the second free roll 15 leaves the disc 3 (see FIG. 9). Then, the slider 30 actuates the stop switch 34 to stop the drive motor 37. When the disc 3 is released from the second drive roll 9, the second free roll 15, and the free end 27 of the rotary lever 26, the disc 3 on the turntable starts rotating for reproducing sound or pictures.

FIG. 10 shows how the second drive roll 9 can leave the disc 3 in response to withdrawal of the slider 30 to the final rear position. As the slider 30 moves rearward, the guide pin 35 of the rotatable arm plate 8a climbs the slope section of the cam rib 36, and accordingly the guide pin 35 moves leftward, and accordingly the rotatable arm plate 8a turns counterclockwise about its pivot 5. Thus, the second drive roll 9 leaves the disc 3.

In case that the disc 3 is removed from the turntable, and is ejected from the disc slot 4, the disc motor 37 is made to rotate in the opposite direction, and the slider 30 moves toward the disc slot 4. The rotary lever 26 turns clockwise toward its original position under the influence of the coiled spring 41, keeping pace with the forward movement of the slider 30. Then, the disc 3 is pushed down by the free end 27 of the rotary lever 26 until the disc 3 is caught by the second drive roll 9. After the disc 3 leaves the free end 27 of the rotary lever 26, the second drive roll 9, the second free roll 15, the first drive roll 5 and the first free roll 13 work together to pinch, carry and eject the disc 3 from the disc slot 4.

As may be understood from the above, the loading-and-unloading structure according to the present invention is simple in structure, still assuring that a disc can be handled and put on the turntable with precision. The transmission mechanism for carrying, positioning, and releasing the disc uses a single drive motor, and consists of a minimum number of parts. This significantly contributes reduction both of the whole size of the disc apparatus, and the manufacturing cost. Further, the mechanical structure of switching control means in the structure makes possible to reduce trouble and improve the motional reliability.

What is claimed is:

1. A disc loading-and-unloading structure for a disc apparatus comprising:
    a drive motor;
    a drive roll assembly comprising first and second drive rolls and, an intervening transmission gear wheel, and a rotatable arm plate, the first drive roll being rotatably fixed to a stationary stud axle standing upright on a chassis of the disc apparatus, next to one end of a disc slot made in the front of the apparatus, and the first drive roll being connected to the drive motor; the first and second drive rolls being fixed to the opposite ends of the rotatable arm plate with the intervening transmission gear wheel sandwiched therebetween;
    a free-roll slider movably fixed to the chassis of the apparatus, next to the other end of the disc slot, the free-roll slider comprising first and second free rolls, and a slidable arm plate, the first and second free rolls being fixed to the opposite ends of the slidable arm plate;
    a rotary lever rotatably fixed to the chassis on the rear side of the chassis so that its free end may abut a disc when being inserted from the disc slot and advancing toward the rear side in the apparatus;
    a slider operatively connected to the rotary lever; and
    link-and-spring connection means for normally urging the free-roll slider toward the drive roll assembly, allowing the free-roll slider to move apart from the drive roll assembly as a counter action to hitting-and-pushing by the disc when inserted into the apparatus; wherein the drive roll assembly, the free-roll slider and the rotary lever are adapted to work together and hold the disc on its circumference by applying the second drive roll, the second free roll and the free end of the rotary lever to three points on the circumference of the disc.

2. A disc loading-and-unloading structure according to claim 1, wherein further comprising a pinion connected to the drive motor,
    the slider has a rack fixed thereon and a cam slot made on its rear side, the rack being placed toward the disc slot, extending rearward in the disc-carrying direction; and the rotary lever has means for urging its free end toward the disc when advancing rearwards from the disc slot, and has a boss slidably fitted in the cam slot of the slider, whereby inclination of the rotary lever when being hit and pushed by the advancing disc makes the boss follow the contour of the cam slot, thus making the pinion mesh with the rack, and allowing the rack and pinion to drive the slider rearward.

3. A disc loading-and-unloading structure according to claim 2, wherein the link-and-spring connection comprises a series link connection of first, second and third links articulated with each other, the first link being connected to the free-roll slider, the second link being articulated to the rotatable arm plate of the drive roll assembly, and the third link being rotatably fixed around a stationary stud axle, and being articulated both to the first and second links; the slider has a cam rib extending from its front edge; the drive roll assembly has a guide pin standing upright on the rotatable arm plate, which the guide pin being adapted to ride on the cam rib when the slider remains in the forward position, and depart from the cam rib when the slider is driven rearward, thus allowing the second drive roll, the second free roll and the free end of the rotary lever to depart from the circumference of the disc simultaneously.

4. A disc loading-and-unloading structure according to claim 1, wherein further comprising start and stop switches, the start switch being responsive to the lateral movement of the free-roll slider for turning on, thus starting the drive motor, and the stop switch is responsive to arrival of the slider at the final rear position for turning off, thereby stopping the drive motor.

\* \* \* \* \*